US010499558B2

(12) United States Patent
Stevenson

(10) Patent No.: US 10,499,558 B2
(45) Date of Patent: Dec. 10, 2019

(54) METER FOR DISPENSING A GRANULAR PRODUCT

(71) Applicant: Kinze Manufacturing, Inc., Williamsburg, IA (US)

(72) Inventor: Vaughan Stevenson, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 21 days.

(21) Appl. No.: 15/457,230

(22) Filed: Mar. 13, 2017

(65) Prior Publication Data

US 2017/0245423 A1 Aug. 31, 2017

Related U.S. Application Data

(63) Continuation of application No. 14/164,604, filed on Jan. 27, 2014, now Pat. No. 9,622,401.

(51) Int. Cl.
*A01C 7/16* (2006.01)
*A01C 19/02* (2006.01)
*G01F 13/00* (2006.01)

(52) U.S. Cl.
CPC .............. *A01C 7/166* (2013.01); *A01C 19/02* (2013.01); *G01F 13/001* (2013.01)

(58) Field of Classification Search
CPC .. A01C 7/166; A01C 7/16; A01C 7/00; A01C 19/02; G01F 13/001
See application file for complete search history.

(56) References Cited

U.S. PATENT DOCUMENTS

| | | | | |
|---|---|---|---|---|
| 439,773 A | * | 11/1890 | Cole | A01C 15/16 222/242 |
| 2,358,208 A | | 9/1944 | Braden | |
| 2,612,299 A | | 9/1952 | McCabe | |
| 2,874,878 A | | 2/1959 | Stokland | |
| 2,969,769 A | | 1/1961 | Paschall | |
| 3,670,671 A | | 6/1972 | Lienemann | |
| 3,945,537 A | | 3/1976 | Langen | |
| 4,162,842 A | * | 7/1979 | Wu | G03G 15/09 399/256 |
| 4,391,140 A | | 7/1983 | Reinhard et al. | |
| 4,465,017 A | * | 8/1984 | Simmons | A01C 1/06 118/418 |
| 4,993,634 A | * | 2/1991 | Hach | A01C 23/042 239/10 |
| 5,176,322 A | * | 1/1993 | Sartor | A01M 7/0014 239/159 |
| 5,301,848 A | * | 4/1994 | Conrad | A01C 7/105 111/903 |

(Continued)

*Primary Examiner* — Patrick M. Buechner
(74) *Attorney, Agent, or Firm* — McKee, Voorhees & Sease, PLC

(57) ABSTRACT

A chemical granule metering system, for use on a row crop planter, allows for control of chemical granule drop rate. The chemical granule metering system also includes a motor permitting control of chemical granule drop rate by adjusting the rotational speed of the motor. An impeller for a chemical granule meter system having a plurality of apertures is optimized to allow a broad range of chemical granule flow rates, reduce or mitigate clogging, and reduce pulsing characteristics of the metering system.

20 Claims, 10 Drawing Sheets

(56) References Cited

U.S. PATENT DOCUMENTS

| | | | | |
|---|---|---|---|---|
| 5,599,163 | A * | 2/1997 | Heath | F04D 5/002 415/55.1 |
| 5,641,011 | A | 6/1997 | Benedetti, Jr. et al. | |
| 5,653,389 | A * | 8/1997 | Henderson | A01M 7/0089 239/172 |
| 5,701,741 | A * | 12/1997 | Halsall | F02B 37/18 60/602 |
| 5,704,546 | A * | 1/1998 | Henderson | A01M 7/0089 239/1 |
| 5,752,788 | A * | 5/1998 | Crum | B05B 7/1422 406/109 |
| 5,895,762 | A * | 4/1999 | Greenfield | G01N 1/31 422/537 |
| 6,003,455 | A * | 12/1999 | Flamme | A01C 23/007 111/200 |
| 6,070,539 | A * | 6/2000 | Flamme | A01B 79/005 111/177 |
| 6,079,340 | A * | 6/2000 | Flamme | A01B 79/005 111/178 |
| 6,347,864 | B1 * | 2/2002 | Silverbrook | B41J 2/17563 347/85 |
| 6,494,447 | B2 * | 12/2002 | Myer, Sr. | B65H 29/40 271/176 |
| 6,582,116 | B2 * | 6/2003 | Nielsen | B01F 7/18 366/279 |
| 6,634,522 | B2 | 10/2003 | Hak | |
| 6,886,717 | B2 * | 5/2005 | Sanders | G01F 11/22 222/333 |
| 7,021,302 | B2 * | 4/2006 | Neumaster | F41B 11/57 124/48 |
| 7,527,078 | B2 * | 5/2009 | Driessen | B01F 13/1058 141/104 |
| 7,975,632 | B2 | 7/2011 | Gogerty et al. | |
| 9,354,636 | B2 * | 5/2016 | McKinzie | F04B 49/065 |
| 9,622,401 | B2 * | 4/2017 | Stevenson | A01C 7/166 |
| 10,071,350 | B2 * | 9/2018 | Lewis | B01F 7/248 |
| 10,136,573 | B1 * | 11/2018 | Arnett | A01C 7/046 |
| 2002/0002414 | A1 * | 1/2002 | Hsiung | G05B 15/02 700/95 |
| 2002/0170476 | A1 | 11/2002 | Bogner et al. | |
| 2007/0295755 | A1 * | 12/2007 | Kinzie | G01F 11/24 222/239 |
| 2009/0078178 | A1 * | 3/2009 | Beaujot | A01C 7/084 111/170 |
| 2011/0027479 | A1 * | 2/2011 | Reineccius | A01C 1/08 427/212 |
| 2013/0192503 | A1 * | 8/2013 | Henry | A01C 7/082 111/174 |
| 2013/0233088 | A1 * | 9/2013 | Noble | A01C 7/105 73/861 |
| 2014/0230705 | A1 * | 8/2014 | Radtke | A01C 7/046 111/177 |
| 2014/0318009 | A1 * | 10/2014 | Strahm | A01C 1/06 47/57.6 |
| 2015/0134210 | A1 * | 5/2015 | Steffen | A01C 21/005 701/50 |
| 2016/0071410 | A1 * | 3/2016 | Rupp | H04W 4/70 701/50 |
| 2017/0248453 | A1 * | 8/2017 | Herlitzius | G01F 1/661 |
| 2017/0303463 | A1 * | 10/2017 | do Amaral Assy | A01C 7/046 |

\* cited by examiner

METER FOR DISPENSING A GRANULAR PRODUCT

CROSS-REFERENCE TO RELATED APPLICATIONS

This application is a Continuation Application of U.S. Ser. No. 14/164,604, filed on Jan. 27, 2014, the contents of which are hereby incorporated by reference in their entirety and for all purposes.

FIELD OF THE INVENTION

The present invention relates generally to mechanisms used in agricultural planting machines for dispensing a granular product. More particularly, but not exclusively, the invention relates to a meter driven by an electric motor. In addition, the invention relates to improved meter components allowing to adjustment of granule drop rates.

BACKGROUND OF THE INVENTION

Planting and chemical granular dispensing systems for dispensing seed and insecticides, herbicides, fungicides or fertilizers, have made the handling of seed and chemical granules less hazardous to the agricultural worker by providing a closed container system, such as those described in U.S. Pat. Nos. 5,301,848 and 4,971,255, incorporated by reference herein and the SmartBox® System marketed by AMVAC Chemical Corporation. Briefly, as described in U.S. Pat. No. 5,301,848, access to and from a container in a closed container system is available through a single opening in the bottom wall of the container, offering distinct advantages over an open-top, non-removable container design in an open container system. Planting and chemical granular dispensing systems for dispensing insecticides, herbicides, fungicides, and/or fertilizers, have made the handling of seed and chemical granules less hazardous to the agricultural worker.

Closed container systems provide a removable container, which is pre-filled with the chemical granules of toxic materials such as insecticides, fertilizers, herbicides and other pesticides, thereby eliminating the need to open and pour bags of chemical granules into storage hoppers. Because the closed container system is largely not open to the air, agricultural workers have less opportunity to come into contact with the chemical granules, thereby reducing skin and inhalation exposure to the hazardous chemicals.

While closed container systems reduce the risk of chemical exposure to agricultural works and others and still dispense the insecticides, pesticides, herbicides or fertilizers based on a desired rate, the amount of chemical granules dispensed is often still greater than what is needed to provide a desired effect. For instance, U.S. Pat. No. 5,271,343 describes a planter system in which chemical granules are dispensed along the entire length of the seed furrow, or trench. In this situation, much of the dispensed chemical granules in the seed furrow are not effectively used due to the distance from the planted seed, reducing overall efficiency.

Research has indicated that it is inefficient to use the conventional method of dispensing chemical granules, in which chemical granules are dispersed over an entire length of the seed furrow in which seed is planted. Instead, dispensing smaller amounts of the chemical granules of insecticides and other pesticides in close proximity to the seed not only obtains the desired effect of eliminating insects or pests, but also reduces the amount of chemical agent that is used to obtain such an effect. As such, the result is more cost effective, environmentally friendly, and less hazardous, while maintaining the desired effect of the chemical granules.

Previously described methods and machines for dispensing chemical granules utilize a pulse plunger or paddle wheel mechanisms. These approaches lead to pulsing or non-continuous flow of granules, and result in friction due to grinding action, which requires high torque to drive the device. Previous methods and systems also lack the ability to drive dispensation of chemical granules using an electric motor, and thus do not permit control of granule flow rates by adjusting rotational speed of the electric motor.

There is a need for a chemical dispensation that more closely regulates the amount of chemical dispensed.

There is further a need for a chemical dispensation system that can be driven by use of an electric motor.

There is a further need for a chemical dispensation system that prevents or mitigates clogging, permits a broad range of flow rates, and reduces or mitigates pulsing.

SUMMARY OF THE INVENTION

It is therefore a primary object, feature, and/or advantage of the present invention to improve on or overcome the deficiencies in the art.

It is another object, feature, and/or advantage of the present invention to ensure constant flow of chemical granule material.

It is still another object, feature, and/or advantage of the present invention to provide a broad range of flow of chemical granule material.

It is still another object, feature, and/or advantage of the present invention to provide reduced clogging of chemical granule material.

It is still another object, feature, and/or advantage of the present invention to provide a chemical granule meter driven by an electric motor.

It is yet another object, feature, and/or advantage of the present invention to provide a chemical granule meter with adjustable control of chemical granule drop rate.

It is yet another object, feature, and/or advantage of the present invention to provide a chemical granule meter that is driven by an electric motor.

These and/or other objects, features, and advantages of the present invention will be apparent to those skilled in the art. The present invention is not to be limited to or by these objects, features and advantages. No single embodiment need provide each and every object, feature, or advantage.

According to an aspect of the invention, a chemical granule meter is provided. The chemical granule meter includes an assembly housing including an internal chamber and an internal passage. The internal chamber contains a shaft drive and worm gear that drive the rotation of an impeller, which is mounted within or on top of the upper aspect of the assembly housing. The impeller transports chemical granules to the upper opening of the internal passage. The granule meter includes an electric motor that drives rotation of the impeller. The motor includes an output shaft that drives an output gear, which is in direct engagement with the worm gear, thereby driving rotation of the impeller. The motor permits modulation of the chemical granule drop rate by adjusting the rotational speed of the motor. In one aspect, the meter also includes a positive shut off mechanism. Granules are conveyed into the impeller via an input tube or a hopper. Once in the impeller, the granules are transported by the rotation of the impeller to the upper opening of the internal passage. When the impeller is stationary walls of the apertures fall between the inlet and the outlet providing a positive shut.

According to another aspect of the invention, an impeller for use with a chemical granule meter of an agricultural implement is provided. The impeller comprises a plurality of apertures having a wave or crescent shape. The wave or crescent shape of the apertures in the impeller reduces or mitigates clogging, allows for a broad range of flow rates, and reduces or mitigates pulsing characteristics.

DETAILED DESCRIPTION OF THE PREFERRED EMBODIMENTS

Figure 1:
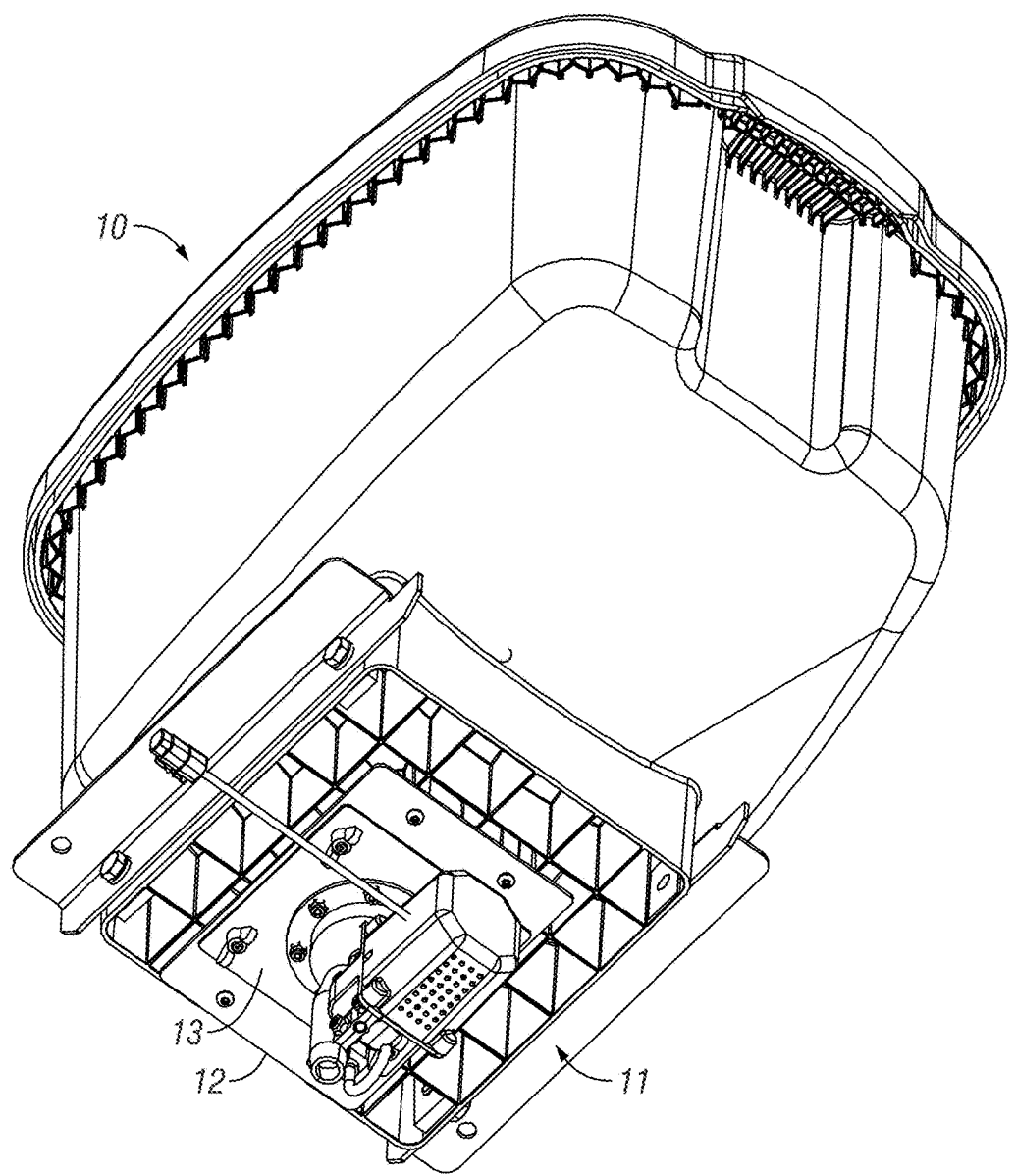
FIG. 1 is a perspective view of a chemical granule dispensing system including a hopper and a granule meter system in accordance with one embodiment of the present disclosure.
Figure 2:
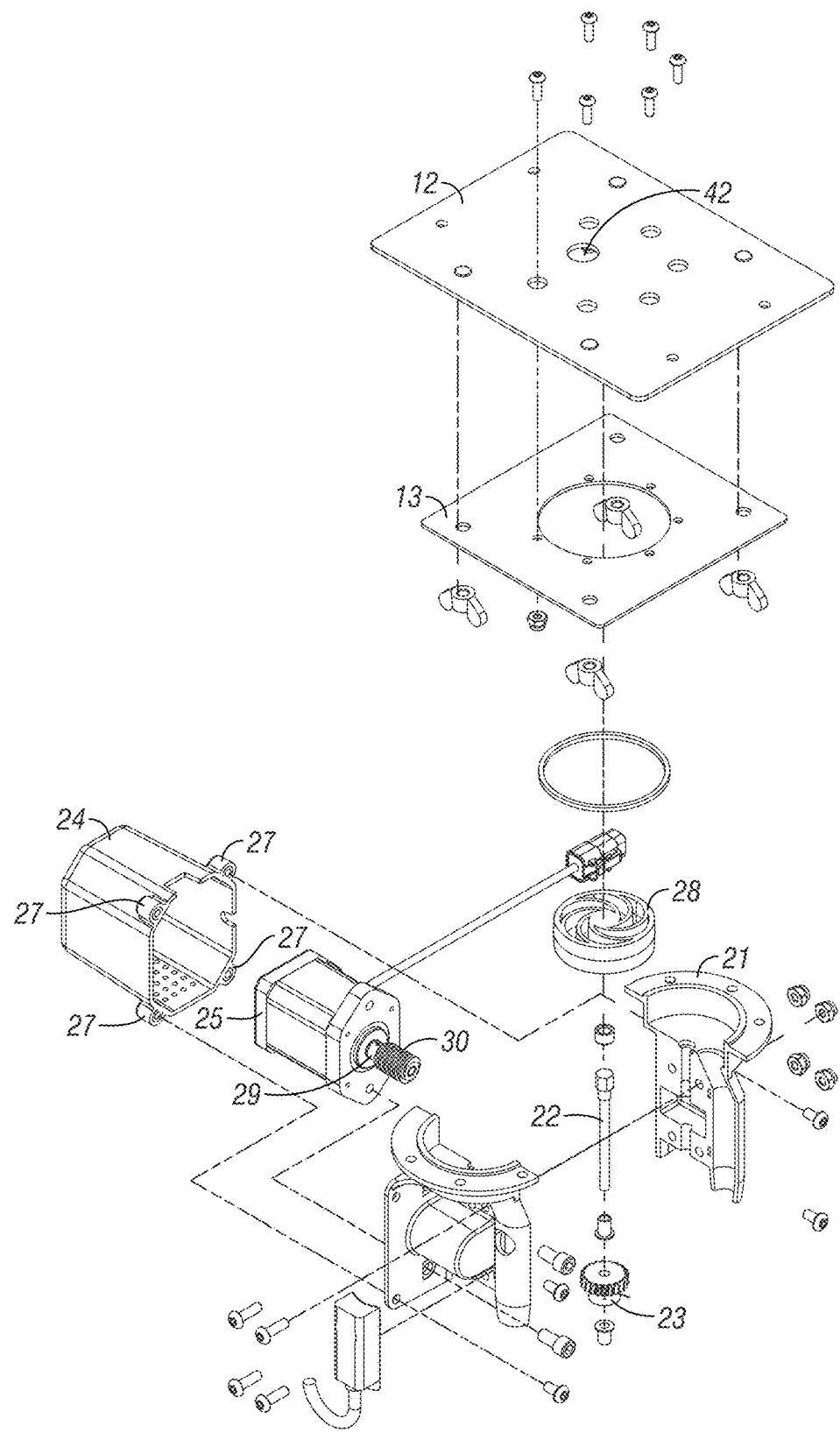
FIG. 2 is a perspective view of a chemical granule meter system in accordance with an embodiment of the present disclosure.
Figure 3:
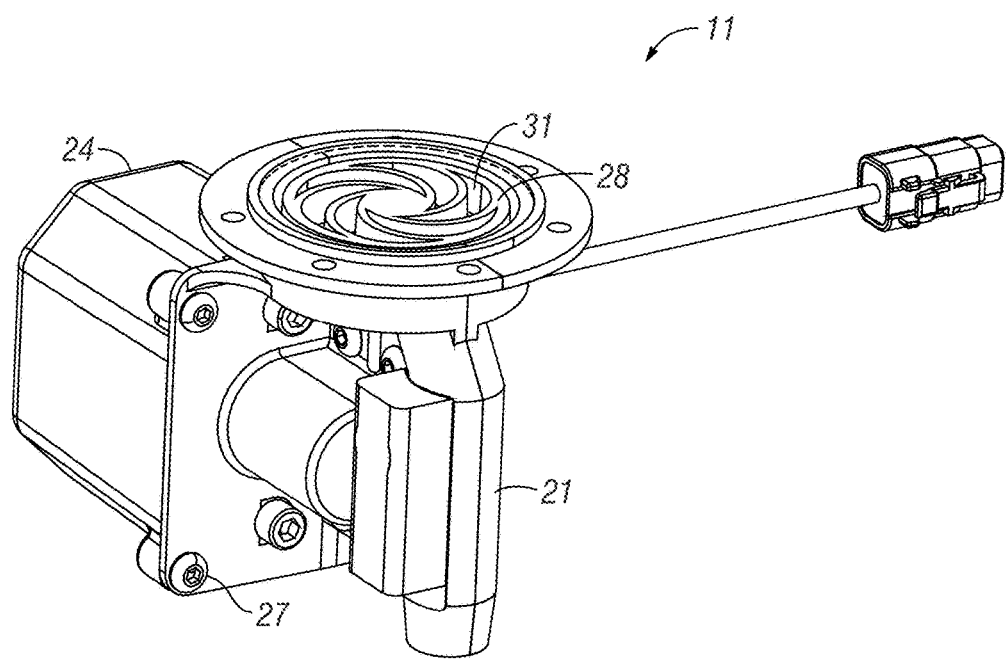
FIG. 3 is a view of a chemical granule meter system in accordance with an embodiment of the present disclosure.

Referring to FIG. 1, a chemical granule dispensing system 9 is shown, including a hopper unit 10 and a chemical granule metering apparatus 11. The chemical granule dispensing system 10 includes a plate mount 12 and plate submount 13 for mounting the chemical granule metering apparatus 11 to the hopper unit 10. The chemical granule dispensing system may be mounted to a conventional planter row unit 7.

FIGS. 2 through 6 disclose a chemical granule meter 11 according to an exemplary embodiment of the invention. The granule meter 11 includes a meter housing 21, which includes an inner chamber that contains a shaft drive 22 and worm gear 23. The shaft drive 22 and worm gear 23 are exposed for illustration purposes in FIG. 2 and FIG. 4, but would normally be concealed within the meter housing 21. The granule meter also includes a motor cover 24 and an electric motor 25 contained within the motor cover 24. The electric motor 25 includes an output shaft 29 that drives an output gear 30. The meter housing 21 also includes an aperture 26 to allow the output shaft 29 and output gear 30 of the motor 25 to pass through. The meter housing 21 further includes attachment means 27 at an outer area of the meter housing, shown here to be apertures, which can be held in place with pins, screws, bolts, or the like. The meter housing 21 and the motor cover 24 may be molded, such that they comprise molded plastic or other rigid materials, such as metallic materials. The granule meter 11 also includes an impeller 28 comprising a plurality of apertures 31. The impeller is operatively connected to the shaft drive 22 and worm gear 23. The worm gear 23 is in direct engagement with the output gear 30 of the step motor 25.

Granules are conveyed into and through one or more apertures 31 of the impeller 28 via an input tube (not shown) or a hopper (FIG. 1). Once in the aperture 31 of the impeller 28, the granules are transported by the rotation of the impeller 28 about its central axis to the upper opening of the internal passage 41. Chemical granules are then released from the apertures 31 of the impeller 28 as they transition through the upper opening of the internal passage 41 of the meter housing. Granules pass through the internal passage 41, and exit the lower opening of the internal passage, which delivers them to the furrow.

Figure 4:
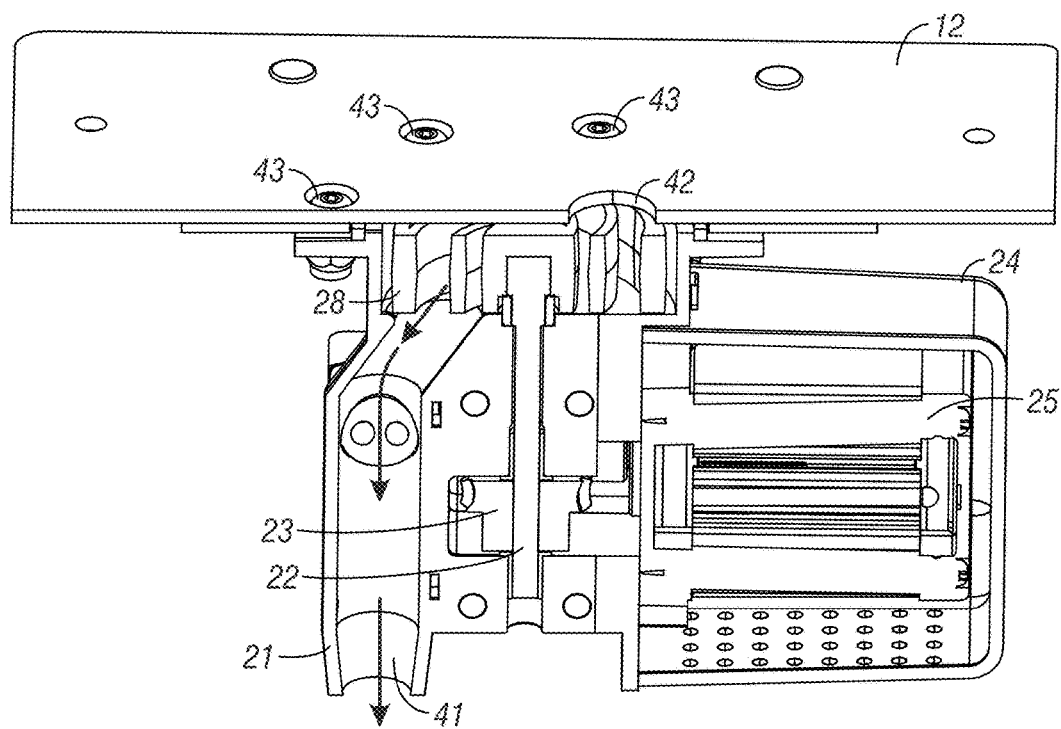
FIG. 4 is a view of a chemical granule meter system in accordance with an embodiment of the present disclosure.
Figure 5:
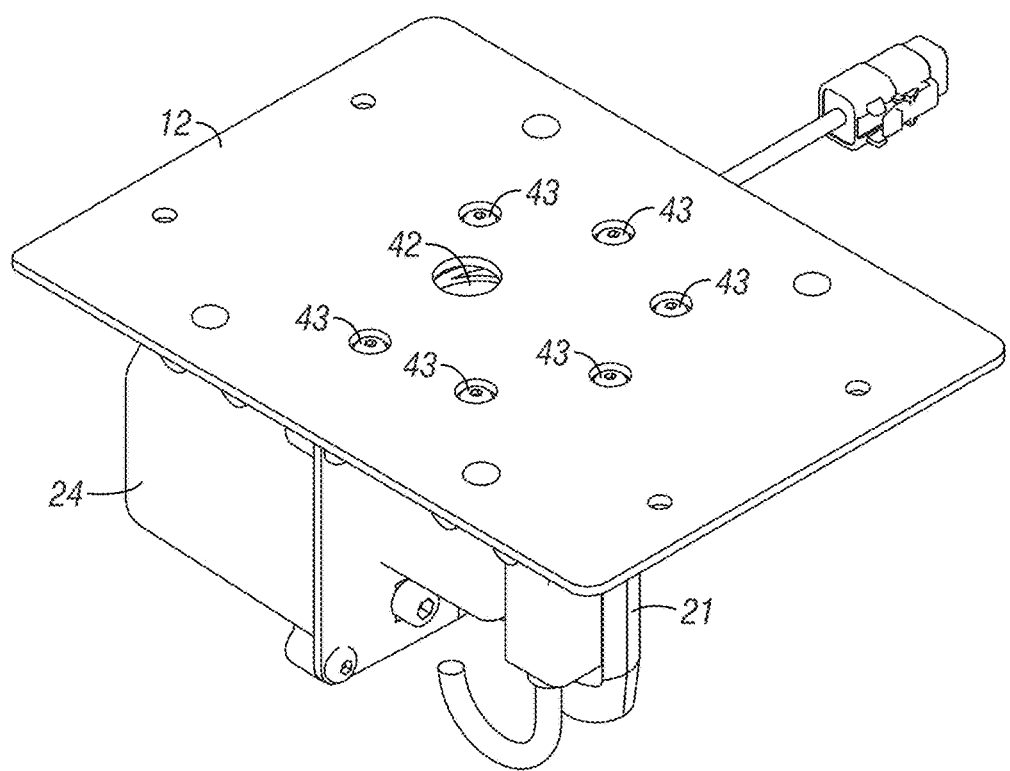
FIG. 5 is a view of a chemical granule meter system in accordance with an embodiment of the present disclosure.
Figure 6:
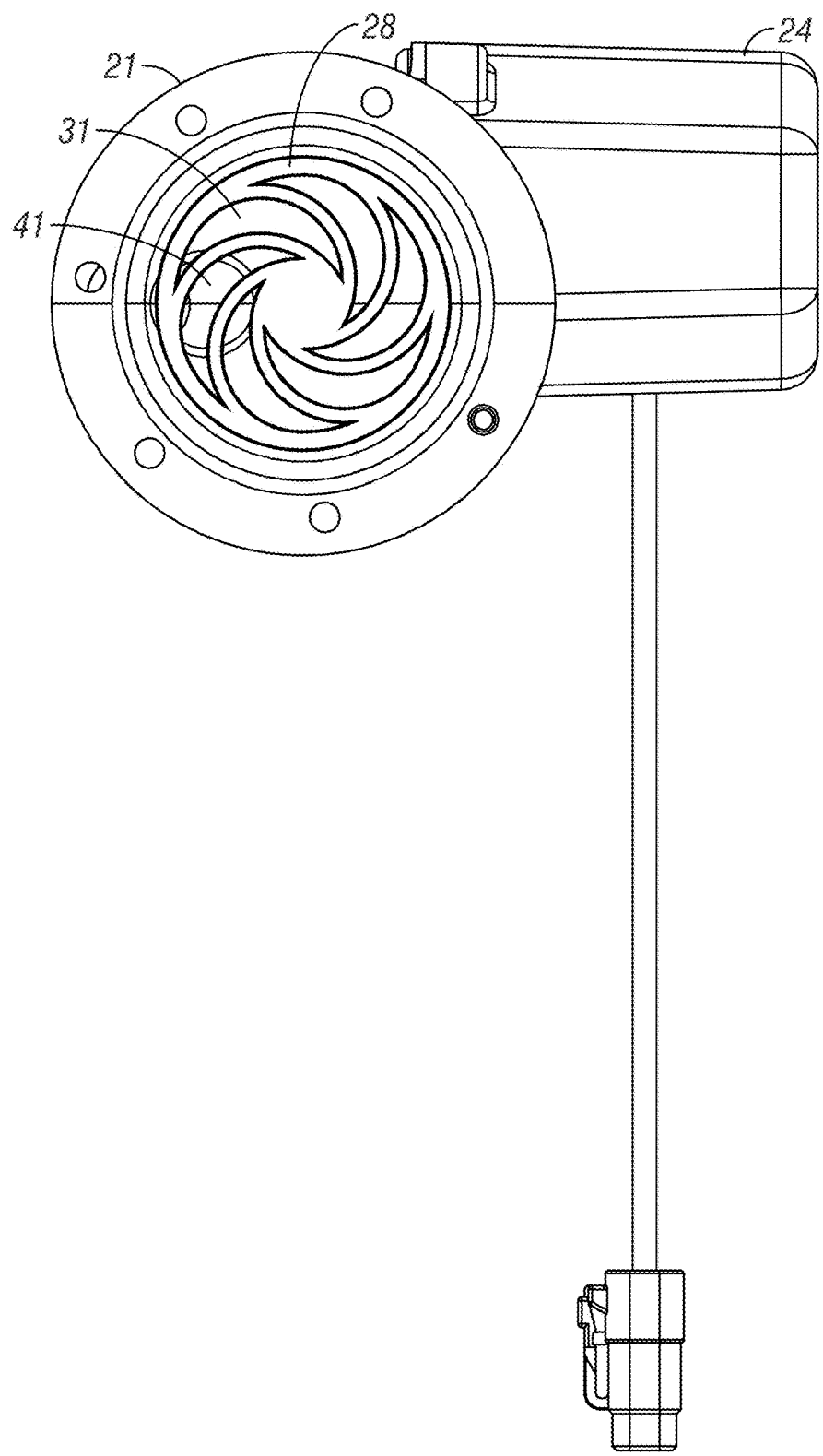
FIG. 6 is a view of a chemical granule meter system in accordance with an embodiment of the present disclosure.
Figure 7:
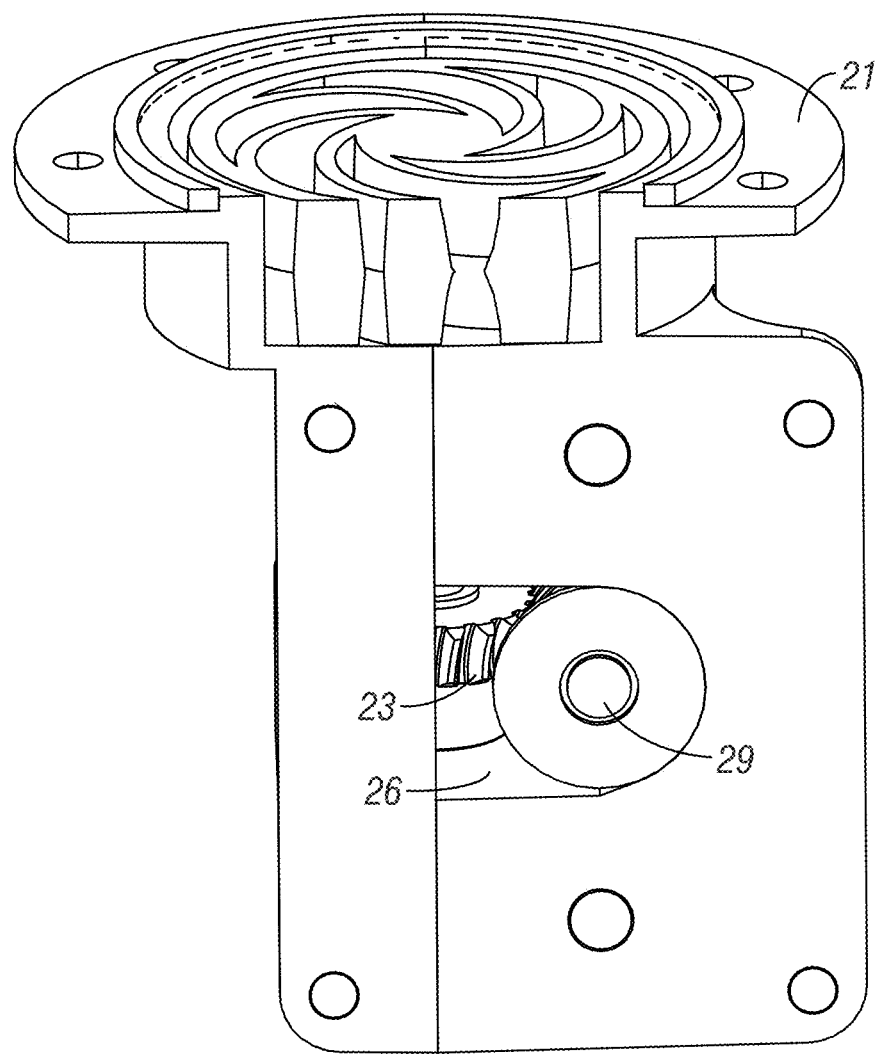
FIG. 7 is a view of a chemical granule meter system in accordance with an embodiment of the present disclosure.

FIG. 4 shows a chemical granule meter 11 attached to a plate mount 12 and plate submount 13 according to an exemplary embodiment of the invention. The plate mount 12 and plate submount 13 provide a means for attaching the chemical granule meter to a hopper or input tube. The plate mount comprises an opening 42 and means for attachment 43 to the plate submount 13 and the meter housing 21, shown here to be apertures that can be held in place with pins, screws, bolts, or the like. FIG. 4 further shows the internal passage 41, with the upper opening proximal to the impeller 28 with apertures 31.

The electric motor 25 is operatively connected to the worm gear 23 and shaft drive 22, permitting the electric motor 25 to drive rotation of the impeller 28. The electric motor 25 is preferably a step motor, but any type of brushed or brushless motor is contemplated for use with the invention. In a preferred embodiment, the electric motor permits control of the drop rate of the chemical granules. In another embodiment, the chemical granule meter further comprises a positive shut off mechanism. For example, the aperture openings 31 are configured such that they cannot align with both the inlet and outlet together. The walls of the apertures fall between the inlet and outlet and positively block the granule flow when the impeller is not rotating.

Figure 8:
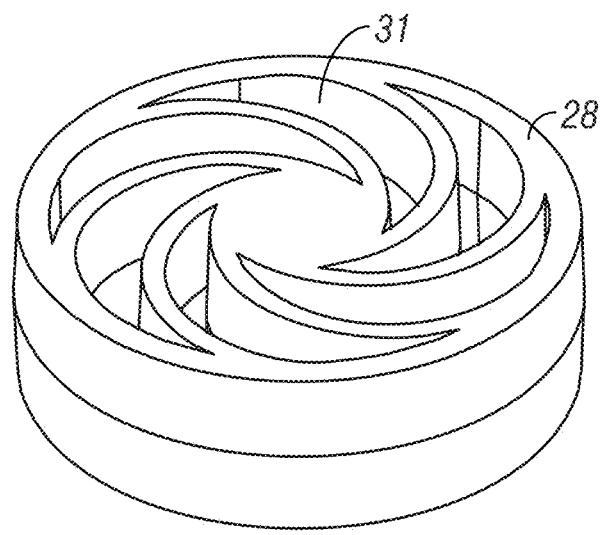
FIG. 8 is a view of an impeller for a chemical granule dispensing system in accordance with an embodiment of the present disclosure.
Figure 9:
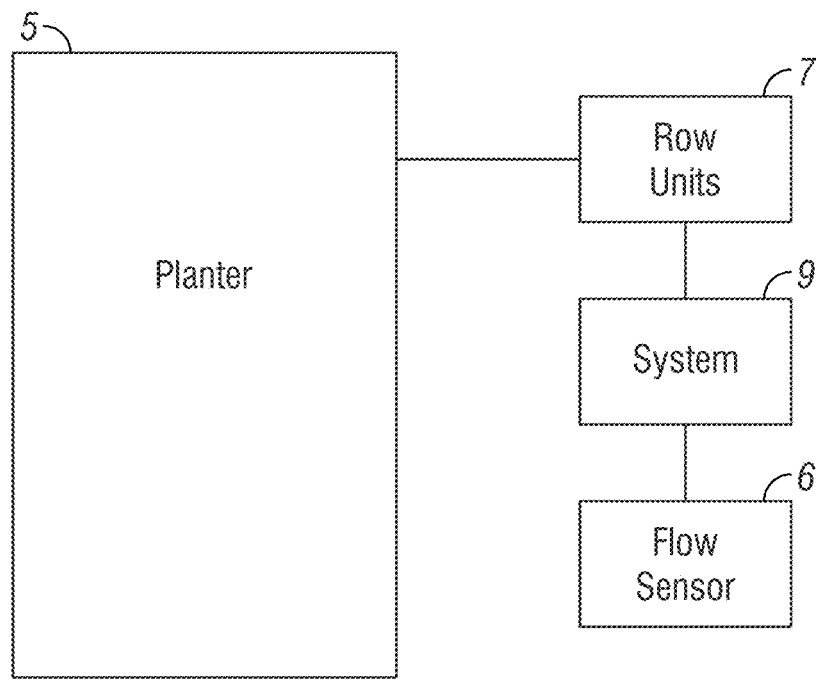
FIG. 9 is a schematic of a planter with row units incorporating the chemical granule meter system according to aspects of the present disclosure.

FIG. 8 shows aspects of an impeller 28 for use in a granule meter. The impeller 28 comprises a plurality of apertures 31 spaced radially about the axis. In some embodiments, the apertures 31 are configured to reduce product pulsing characteristics. In a preferred embodiment, the apertures 31 have a wave or crescent shape. In a preferred embodiment, the wave or crescent shape of the apertures 31 are optimized to provide one or more of a broad range of flow rates, reduced or mitigated chance of clogging, or reduced or mitigated pulsing characteristics. In a preferred embodiment, the apertures 31 are configured to substantially match the curvature of the impeller 28. In a preferred embodiment, the apertures 31 are oriented so the points on one end the wave or crescent shapes are situated near the center of the impeller 28 and the points and the other end of the wave or crescent shapes are situated near the outer edge of the impeller 28, and such that the convex side of the crescent or wave shape is oriented toward the outer edge of the impeller 28.

The shape of the apertures 31 of the impeller 28, along with the dedicated drive of the electric motor 25 for each granule meter provides numerous advantages. For example, the dedicated drive of the electric motor 25 allows for greater control regarding the amount of chemical granule that is dispensed by the meter. This can account for varying speed of the tractor and implement, such as a planter 5 moving through a field. In some instances, the dedicated drive allows for more, less, or no granule to be dispensed, depending on conditions, such as soil conditions, weather conditions, seed types, and the like. It is contemplated that the electric drive of the motor provides for a substantially infinite rate of flow, which can be adjusted as desired.

Furthermore, the wave shape of the impeller apertures 28 mitigates and/or prevents clogging of the chemical granule during dispensement thereof. The waved shape will encourage smooth passage through the impeller 28 as it is rotated, and the chemical granules will be urged through portions of the apertures 31.

Figure 10:
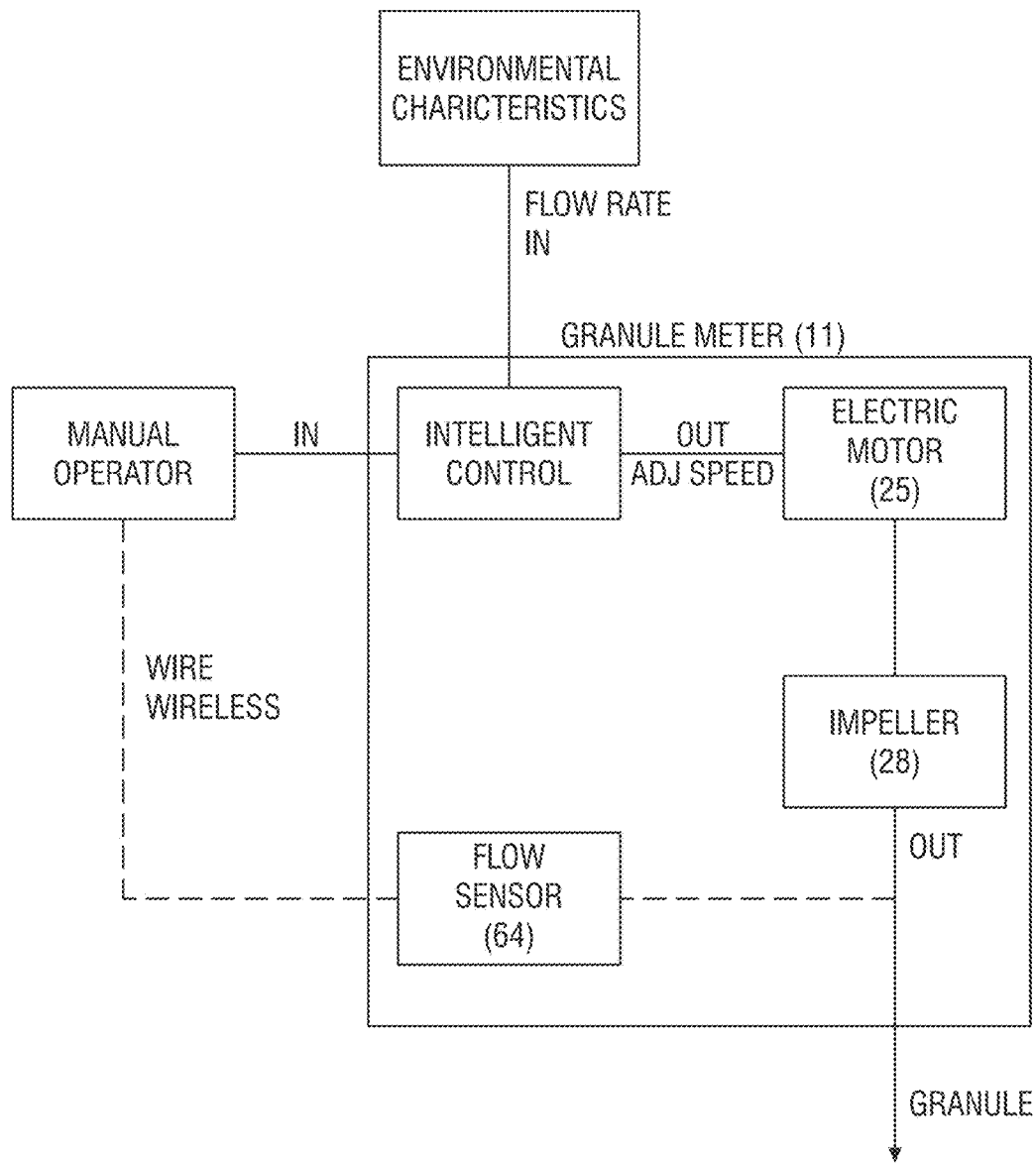
FIG. 10 is a schematic showing an open loop system in which the operator sets a desired flow rate or a flow rate is automatically determined by an intelligent control of the meter based upon some environmental (field, weather, seed type, etc.) characteristics.

Referring now to FIG. 10, other aspects of the granule meter 11 may include the addition of a flow sensor 6 to the granule meter 11. The flow sensor 6, which can be a laser, optic, pneumatic, or other sensor, can be sued to determine the amount of chemical granule that is being dispensed by the meter. The data can then be sent to an operator, either wired or wirelessly. For example, the data and dispensing information of the flow sensor 6 can be shown to an operator of a tractor on a user interface or other display within the cab of the tractor, along with other information related to the implement. However, it is also contemplated that the data could be wirelessly sent to a tablet, phone, or other computing device of an operator such that they are able to view the data and to compare with what is recommended for the varying field and other environmental conditions. The data would allow the operator to update the flow of the chemical granule based upon the information.

In addition, it is contemplated that the data obtained from the flow sensor could be integrated with an open loop system in which the operator sets a desired flow rate or a flow rate is automatically determined by an intelligent control of the meter based upon some environmental (field, weather, seed type, etc.) characteristics, as illustrated in FIG. 10. The open loop system would attempt to maintain a desired flow rate of the chemical granule throughout the changing characteristics to best apply an amount of chemical granule.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A chemical granule meter for use with an agricultural planter, comprising:
    an assembly housing operatively connected to a row unit of the agricultural planter;
    an impeller mounted in said housing for rotation about an axis and having a plurality of apertures spaced radially about the axis for dispensing chemical granules;
    an electric motor with a dedicated drive for driving rotation of said impeller and to permit control of a chemical granule drop rate while accounting for varying speeds of the agricultural planter;
    a positive shut off mechanism to block a flow of the chemical granules between an inlet and an outlet of the chemical granule meter when the impeller is not rotating;
    a level sensor to sense the amount of a granule that is dispensed by the meter; and
    an intelligent control for synthesizing and analyzing data implemented within an open loop system, wherein the intelligent control is adapted to change a speed of rotation of the impeller based, in part, on the sensed amount of granule that is dispensed by the meter and a desired flow rate manually set by an operator.

2. The chemical granule meter of claim 1 wherein the apertures in said impeller are configured to substantially match a curvature of the impeller.

3. The chemical granule meter of claim 1 wherein the apertures in said impeller are wave or crescent shaped.

4. The chemical granule meter of claim 3 wherein points on one end of the wave or crescent shapes are situated near the center of the impeller and points on the other end of the wave or crescent shapes are situated near the outer edge of the impeller, and such that a convex side of the crescent or wave shape is oriented toward the outer edge of the impeller.

5. The chemical granule meter of claim 1 further comprising a shaft drive and worm gear operably connected to said impeller, wherein the motor comprises an output shaft that drives an output gear in direct engagement with a worm gear and shaft drive operably connected to the impeller to cause rotation of the impeller.

6. The chemical granule meter of claim 5 wherein the motor drives rotation of the impeller about an axial axis defined by said shaft drive.

7. The chemical granule meter of claim 1 further comprising one or more of a plate mount and plate submount.

8. The chemical granule meter of claim 1 wherein the motor permits control of the chemical granule drop rate by adjusting the rotational speed of the motor.

9. An agricultural planter including a plurality of row units, said agricultural planter comprising:
    a chemical granule meter comprising an inlet, an outlet, an impeller with a plurality of apertures therein to allow for the passage of one or more types of granules to be dispensed via rotation of the impeller, and a positive shut off mechanism to block a flow of the one or more types of granules between the inlet and the outlet when the impeller is not rotating;
    an electric motor with a dedicated drive operatively connected to the impeller to provide an adjustable rotational speed to the impeller and to permit control of a chemical granule drop rate while accounting for varying speeds of the agricultural planter;
    a flow sensor to sense the amount of the one or more types of granules being dispensed based upon the rotational speed of the impeller; and
    an intelligent control for synthesizing and analyzing data implemented within an open loop system, wherein the intelligent control is adapted to change the rotational speed of the impeller based, in part, on the sensed amount of granule that is dispensed by the meter and a desired flow rate manually set by an operator.

10. The agricultural planter of claim 9, wherein said apertures are crescent shaped with each of the plurality of apertures at least partially overlapping an adjacent aperture such that a portion of one aperture is positioned within a portion of the adjacent aperture to create a wave effect.

11. The agricultural planter of claim 10, wherein said plurality of apertures are at least partially concaved towards a central axis of the impeller.

12. The agricultural planter of claim 11, wherein the apertures are oriented with the crescent shape in a direction of the rotation of the impeller.

13. The agricultural planter of claim 9, wherein the electric motor is a stepper motor.

14. The agricultural planter of claim 9, wherein the amount of the one or more types of granules sensed by the level sensor is communicated to a computing device.

15. The agricultural planter of claim 14, wherein the computing device is remote of the planter, and the communication is done wirelessly.

16. The agricultural planter of claim 14, wherein the computing device is a user interface in a tow vehicle connected to the planter.

17. The agricultural planter of claim 14, wherein the rotational speed of the impeller is adjusted manually.

18. A chemical granule metering device in combination with an agricultural planter, said combination comprising:

said agricultural planter comprising a plurality of row units for planting seed, each of said row units comprising:

an assembly housing and an impeller operatively connected to an electric motor with a dedicated drive to permit control of a chemical granule drop rate while accounting for varying speeds of the agricultural planter;

said impeller having a plurality of apertures spaced radially about an axial axis for dispensing chemical granules;

a positive shut off mechanism to block a flow of the chemical granules between an inlet and an outlet of the chemical granule meter when the impeller is not rotating;

said assembly housing operatively attached to the agricultural planter; and an intelligent control for synthesizing and analyzing data implemented within an open loop system, wherein the intelligent control is configured to vary the flow of the chemical granules and the speed of rotation of the impeller based upon a sensed amount of granule being dispensed by the metering device and a desired flow rate manually set by an operator.

19. The chemical granule metering device of claim 18, further comprising a flow sensor operatively connected to the chemical granule metering device such that the sensor is configured to continuously sense a characteristic of the flow of the chemical granule being dispensed.

20. The chemical granule metering device of claim 19, wherein the flow sensor comprises a laser sensor, optic sensor, or pneumatic sensor.

* * * * *